(12) United States Patent
MacVarish

(10) Patent No.: US 7,765,259 B2
(45) Date of Patent: Jul. 27, 2010

(54) SYSTEM AND METHOD FOR AGGREGATION OF USER CONVERSATIONS AND VISUALIZING PERSONAL COMMUNICATIONS MAP

(75) Inventor: Richard Bruce MacVarish, Hollis, NH (US)

(73) Assignee: Avaya Inc., Basking Ridge, NJ (US)

( * ) Notice: Subject to any disclaimer, the term of this patent is extended or adjusted under 35 U.S.C. 154(b) by 239 days.

(21) Appl. No.: 11/950,995

(22) Filed: Dec. 5, 2007

(65) Prior Publication Data
US 2008/0133581 A1 Jun. 5, 2008

Related U.S. Application Data

(60) Provisional application No. 60/872,927, filed on Dec. 5, 2006.

(51) Int. Cl.
*G06F 15/16* (2006.01)
*G06F 15/173* (2006.01)

(52) U.S. Cl. .................. 709/204; 709/207; 709/240
(58) Field of Classification Search .................. None
See application file for complete search history.

(56) References Cited

U.S. PATENT DOCUMENTS

| 7,111,047 B2 * | 9/2006 | McCarthy et al. ............ 709/206 |
| 2002/0198768 A1 * | 12/2002 | Huppenthal .................. 705/14 |
| 2005/0076110 A1 * | 4/2005 | Mathew et al. .............. 709/223 |

* cited by examiner

*Primary Examiner*—John B. Walsh
(74) *Attorney, Agent, or Firm*—Chapin IP Law, LLC

(57) ABSTRACT

A method, apparatus and computer program product for mapping user conversations is presented. Communications and conversations between a user and people across multiple modes of communication are aggregated to provide an aggregated set of user data. The aggregated set of user data is filtered to provide filtered user data. Additionally, the filtered user data is mapped to determine at least one of social rank, relevance and attention for a user's social network.

24 Claims, 5 Drawing Sheets

SYSTEM AND METHOD FOR AGGREGATION OF USER CONVERSATIONS AND VISUALIZING PERSONAL COMMUNICATIONS MAP

CROSS REFERENCE TO RELATED APPLICATIONS

The present application claims the benefit of U.S. Provisional Patent Application No. 60/872,927, filed on Dec. 5, 2006, which is incorporated herein by reference in its entirety.

BACKGROUND

As the social and professional networks of people becomes connected, and connectivity becomes increasingly widespread, a person's ability to manage and optimize how time is allocated to important information and people is vital to personal productivity. Tools, systems, and practices are required to help people cope with what is otherwise known as "Conversation Overload". Fortunately, advances in this area are coming from several directions, ranging from communications systems to search-based technologies for managing and organizing information.

Today, users have found ways to manage information overload. Users have come to realize that they can/will not be able to read/know all the things they think they should read/know. But, conversation overload is different, because users want to have all these conversations. They are important to users and are self activated expressions of their intent.

There are several conventional systems attempting to manage communications overload or conversation overload. These include Attensa which uses Real Simple Syndication (RSS) technology to track user subscriptions to help users track where they spend their time and attention. Another system is AttentionTrust, a Firefox plug-in that allows users to track their web "click-streams" and manage how their time spent on web pages is used to convey their attention. Touchstone has created an Attention Engine that collects where users spend their attention and allows them to share that information broadly or selectively. Google uses key word mapping of user emails to trigger advertisement placements that are relevant to users email communication conversations.

SUMMARY

Conventional mechanisms such as those explained above suffer from a variety of deficiencies. One such deficiency is that there is not an easy way to accurately visualize a person's personal social network captured by their actions.

Embodiments of the invention significantly overcome such deficiencies and provide mechanisms and techniques that provide aggregation, filtering and personal mapping of a users flow of communications and conversations across multiple modes of communication including phone calls, e-mails, Instant Messages (IMs), voice mails, conversation and media tags, collaboration sessions and the like.

In a particular embodiment of a method of mapping user conversations, the method includes aggregating communications and conversations between a user and people across multiple modes of communication channels or flows to provide an aggregated set of user data. The method also includes filtering the aggregated set of user data to provide filtered user data. Additionally, the method includes mapping the filtered user data to visualize and determine at least one of social rank, relevance and attention for a users social network.

Other embodiments include a computer readable medium having computer readable code thereon for mapping and visualizing user conversations. The computer readable medium includes instructions for aggregating communications and conversations between a user and people across multiple modes of communication to provide an aggregated set of user data. The computer readable medium also includes instructions for filtering the aggregated set of user data to provide filtered user data. Additionally, the computer readable medium includes instructions for mapping the filtered user data to determine at least one of social rank, relevance and attention for a users social network.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides mapping user conversations as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations for mapping user conversations as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya, Inc. of Lincroft, N.J.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1A:
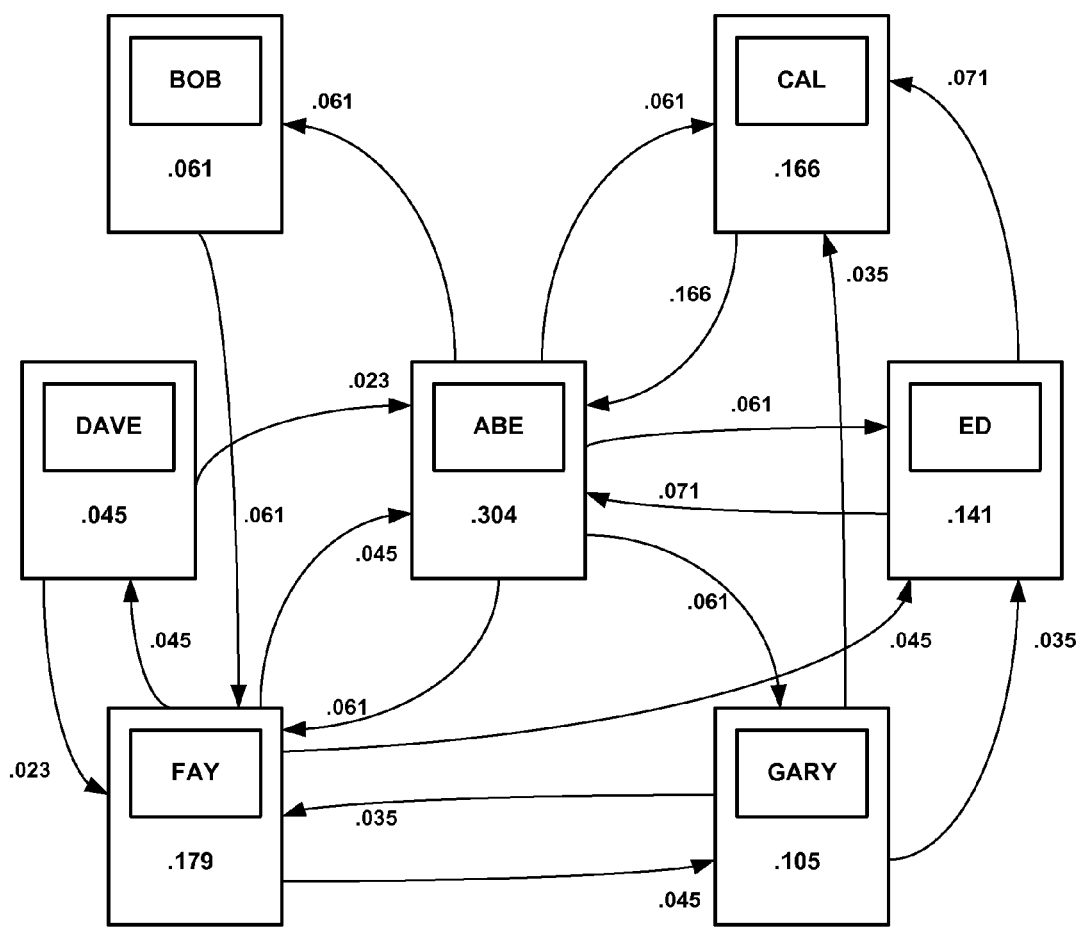
FIGS. 1A, 1B and 1C depict different diagrams showing a mapping of user communications.

A system and method for integrating a user's communications activity across multiple modes is described. The system and method tags and manages user's conversations throughout their day and maps them to their own personal and professional social networks. The user's communications include phone calls, voice mail, Instant Messages (IM), web and email logs, conversation captures and tagging of communications and/or social media. For many users it may be the first time a user has seen their true personal and professional network—created from their communication actions and their conversations—outlined in a simple usable way.

In one embodiment a computer system referred to herein as a Conversation Aggregation Server (CAS) is positioned as the central data store of user conversations by collecting communication log data across enterprise communications, mobile and messaging modes and capturing for all modes the "who", "how long", "when" and personal communication tagging information for every communication event. This information is mapped against central user and personal contact directories to synchronize names to phone numbers, IM handles or buddy names.

Leveraging the results of a Communications Rank (CommRank) algorithm and methodology, conversations with personal contacts are ranked for the user and reflect the prevalence and prestige of each conversation event. This provides a relative ranking of the most important and least important conversation events for the user. An example communications ranking methodology is described in detail in application Ser. No. 11/951,004, filed on the same date as the present application and which is incorporated by reference in its entirety.

A Communications Map (CommMap) client provides a simple, intuitive user interface that maps user conversations data enabling users to visualize their personal and professional social network from their communication actions. The CommMap client may use a methodology such as that described in detail in co-pending patent application titled "System and Method for Determining Social Rank, Relevance and Attention", Ser. No. 11/951,004, filed in even date herewith, the disclosure of which is incorporated by reference in its entirety. The CommMap client captures and illustrates how a user allocates their personal attention to conversations across their social network. The CommMap also enables the user to identify opportunities to optimize how they allocate their time and/or how they manage their social network.

The methodology serves to relate the relevance of communications with one person to another. The comparison mechanism may include factors such as the amount of time spent communicating with that person, the topics and conversations tagged by that person and/or the mode(s) of communication used to communicate with that person. Additionally, a weighting factor may be used wherein a communication with a particular person carries more prestige than a communication with a different person. The weighting may be per person, per communication tag or per communication.

As an example, user Abe communicates with Bob and Carol. A ranking based solely on time spent communicating between Abe and Bob and between Abe and Carol may show that Abe spends more time communicating with Bob than with Carol. However, because Bob is a neighbor of Abe, the communications between Abe and Bob may include relatively unimportant communications (want to go out for lunch, did you watch the game last night, etc.). On the other hand, though Abe spends less time communicating with Carol, these communications have more prestige since Carol is Abe's supervisor, and their communications could include things like project status, assignments, and potential for promotion or pay increases. Thus, though Abe spends less time communicating with Carol than he does with Bob, the communications with Carol are more important and thus have more prestige and would carry a higher rank.

A diagram of a first example communication map 10 is shown in FIG. 1A. In this example CommMap 10, Abe is the user and is shown as a central node. A small circle of people that Abe communicates with are also shown as nodes with links. Abe communicates with Bob, Cal, Dave, Ed, Fay and Gary. Each of these nodes includes a link from Abe and may also include a link to Abe. Each link has a corresponding weight assigned to it, used to indicate the amount of time and the associated prestige for that link to that other person. For example, Abe communicates with Bob via a link showing a weight of 0.061. Bob however does not communicate with Abe directly, and instead communicates only with Fay (who may be Bob's supervisor). Fay communicates with Abe and also receives communications from Abe. Each node shows the total of the weights coming into and going out of the node. From this diagram it can be seen that Abe has highest communications rank with Fay and the lowest with Dave. From reviewing the communications map 10, Abe may see that he needs to spend more time communicating with Dave, and/or less time communicating with Fay.

Figure 1B:
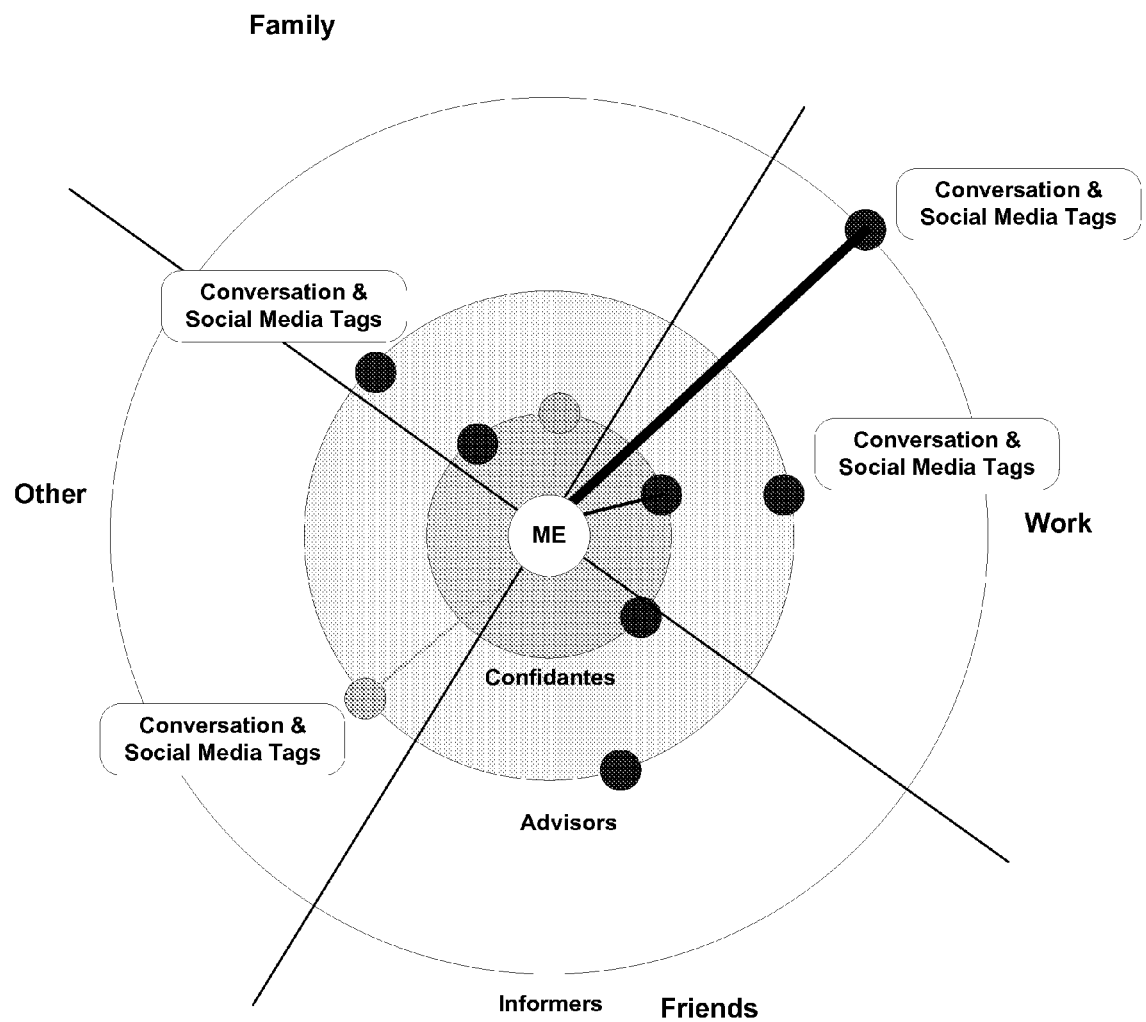
Figure 1C:
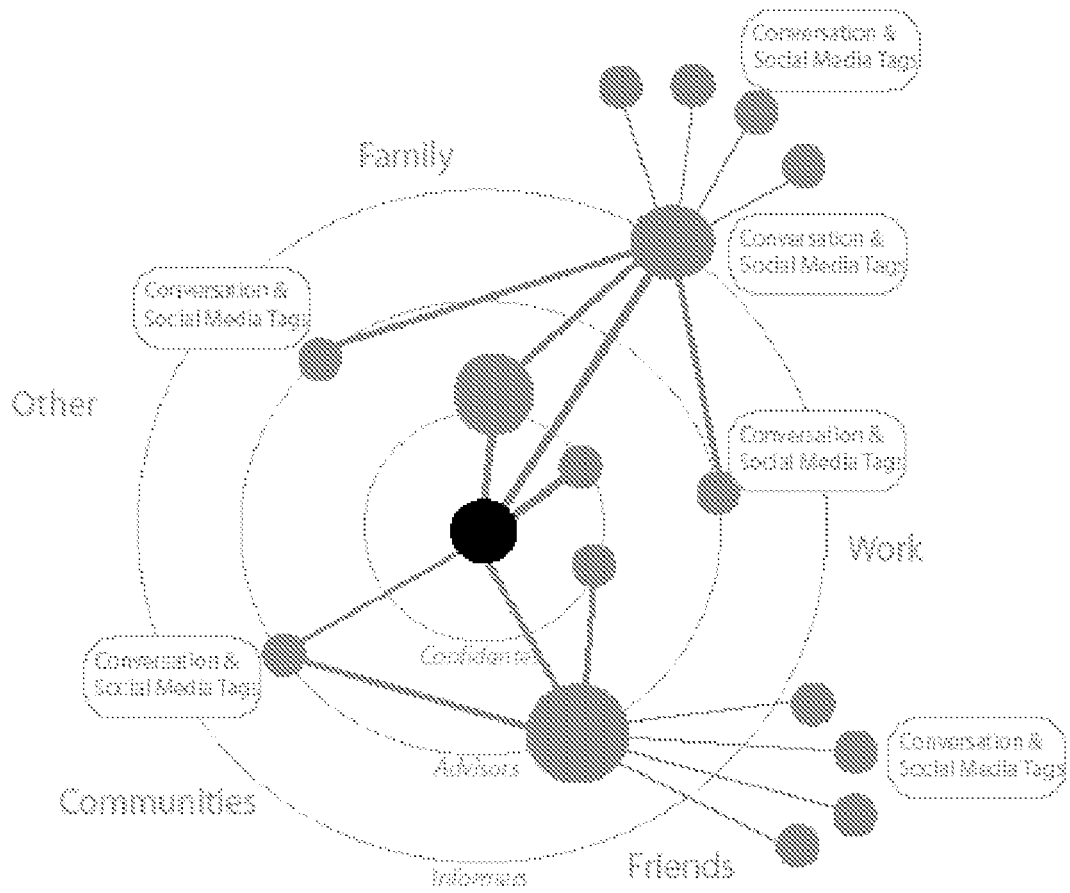

FIG. 1B shows a different style of communication map as that shown in FIG. 1A. In the map of FIG. 1B, the user is a central node and various other conversation and social media tags are shown relating to the user and the user's family, work, friends, communities and other. This diagram illustrates that most of the user's conversations take place at work and with the user's family. FIG. 1C is similar to FIG. 1B, but this communications map further includes links showing the conversations that take place between various persons and the user as well as conversation between different persons.

Figure 2:
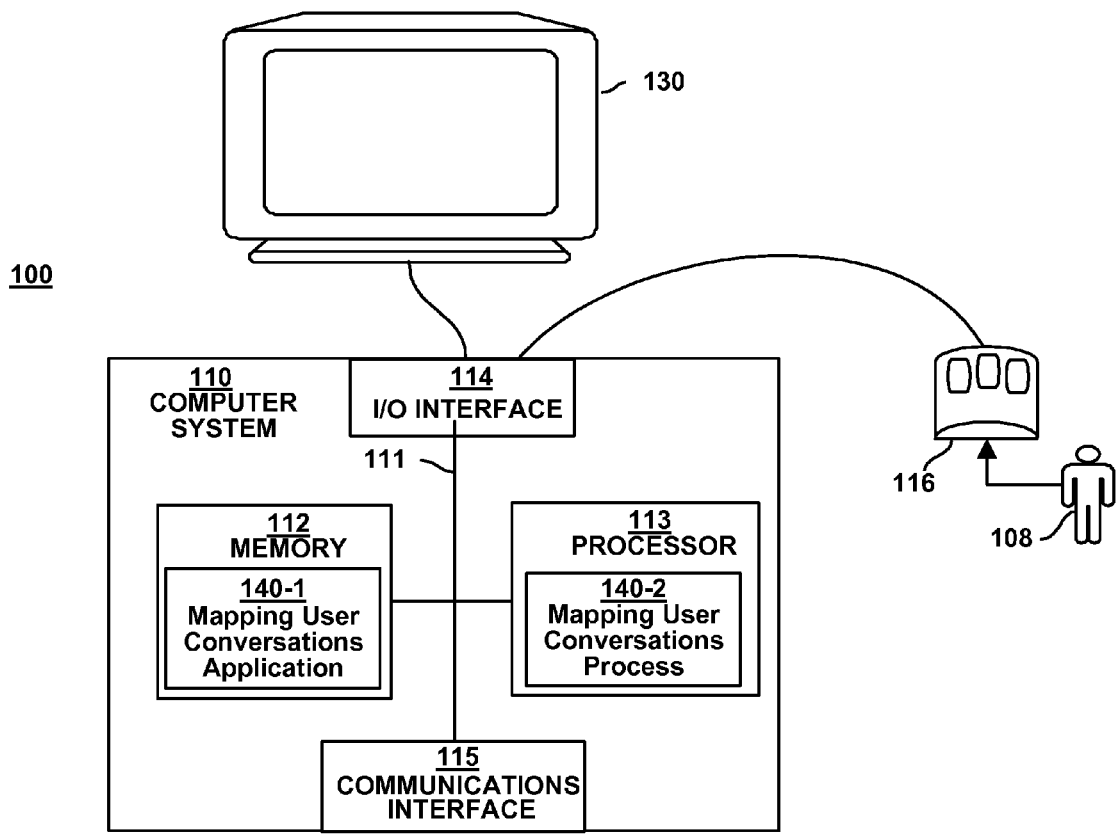
FIG. 2 illustrates an example computer system architecture for a computer system that provides for mapping user conversations in accordance with embodiments of the invention.

FIG. 2 is a block diagram illustrating an example computer system 100 for implementing the mapping user conversations function 140 and/or other related processes to carry out the different functionality as described herein.

As shown, computer system 100 of the present example includes an interconnect 111 that couples a memory system 112 and a processor 113 an input/output interface 114, and a communications interface 115. User 108 is able to interact with mapping user conversation application 140-1 and mapping user conversation application 140-2 by way of display device 130 and user input device 116.

As shown, memory system 112 is encoded with mapping user conversations application 140-1. Mapping user conversations application 140-1 can be embodied as software code such as data and/or logic instructions (e.g., code stored in the memory or on another computer readable medium such as a disk) that support functionality according to different embodiments described herein.

During operation, processor 113 of computer system 100 accesses memory system 112 via the interconnect 111 in order to launch, run, execute, interpret or otherwise perform the logic instructions of the mapping user conversations application 140-1. Execution of mapping user conversations application 140-1 produces processing functionality in mapping user conversations process 140-2. In other words, the mapping user conversations process 140-2 represents one or more portions of the mapping user conversations application 140-1 (or the entire application) performing within or upon the processor 113 in the computer system 100.

It should be noted that, in addition to the mapping user conversations process 140-2, embodiments herein include the mapping user conversations application 140-1 itself (i.e., the un-executed or non-performing logic instructions and/or data). The mapping user conversations application 140-1 can be stored on a computer readable medium such as a floppy disk, hard disk, or optical medium. The mapping user conversations application 140-1 can also be stored in a memory type system such as in firmware, read only memory (ROM), or, as in this example, as executable code within the memory system 112 (e.g., within Random Access Memory or RAM).

In addition to these embodiments, it should also be noted that other embodiments herein include the execution of mapping user conversations application 140-1 in processor 113 as the mapping user conversations process 140-2. Those skilled in the art will understand that the computer system 100 can include other processes and/or software and hardware components, such as an operating system that controls allocation and use of hardware resources associated with the computer system 100.

Figure 3:
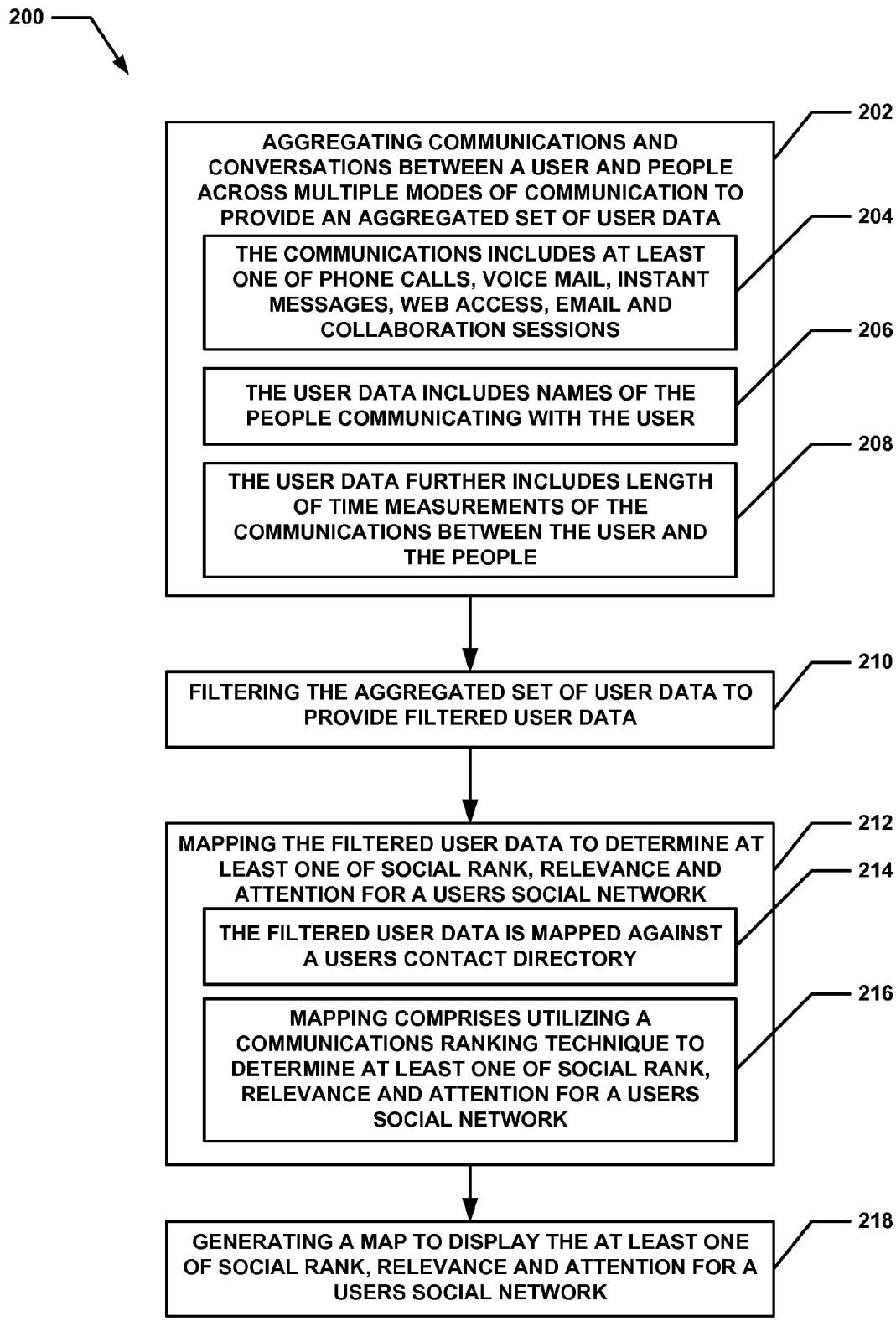
FIG. 3 depicts a flow diagram of a particular embodiment of a method for mapping user conversations in accordance with embodiments of the invention.

A flow chart of a particular embodiment of the presently disclosed method is depicted in FIG. 3. The rectangular elements are herein denoted "processing blocks" and represent computer software instructions or groups of instructions. Alternatively, the processing represents steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

In a particular embodiment, method 200 begins with processing block 202, which discloses aggregating communications and conversations between a user and people across multiple modes of communication to provide an aggregated set of user data. Different flows may be aggregated, such as only those behind a firewall or only those outside a firewall. As shown in processing block 204, the communications includes at least one of phone calls, voice mail, instant messages, web access, email and collaboration sessions. Processing block 206 states user data includes names of the people communicating with the user. Further, as shown in processing block 208 user data further includes length of time measurements of the communications between the user and the people communicated with by the user.

Processing block 210 recites filtering the aggregated set of user data to provide filtered user data. The filtering may user-defined and may include filtering such as only filtering work-related communications, filtering personal communications or a combination of work-related and personal communications.

Processing continues with processing block 212 which discloses mapping the filtered user data to determine at least one of social rank, relevance and attention for a users social network. As shown in processing block 214 this may include wherein the filtered user data is mapped against a users contact directory. Processing block 216 recites wherein the mapping comprises utilizing a Communications Ranking technique to determine at least one of social rank, relevance and attention for a users social network.

Processing block 218 states generating a map to display the at least one of social rank, relevance and attention for a users social network. Various types of maps may be generated including one similar to that shown in FIG. 1.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

The devices or computer systems that integrate with the processors may include, for example, a personal computers, workstations (e.g., Sun, HP), personal digital assistants (PDAs), handheld devices such as cellular telephones, laptops, handheld computers, or another devices capable of being integrated with a processors that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the Internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer implemented method of mapping user conversations comprising:
   aggregating, by a computer, communications and conversations between a user and people across multiple modes of communication to provide an aggregated set of user data;
   filtering said aggregated set of user data to provide filtered user data;
   mapping said filtered user data to determine at least one of social rank, relevance and attention for a users social network; and
   generating a map to display said at least one of social rank, relevance and attention for a user's social network, wherein said map includes at least one of the group consisting of a map wherein:
   i) a user is a central node and wherein a circle of people said user communicates with are shown as nodes with links to said user and wherein each link has a corresponding weight, used to indicate an amount of time and an associated prestige for that link to said user; and
   a user is a central node and social media tags with others showing conversations between said user and others and conversations between different parties are shown.

2. The method of claim 1 wherein said communications includes at least one of phone calls, voice mail, instant messages, web access, email, tags of communication and social media and collaboration sessions.

3. The method of claim 1 wherein said user data includes names of said people communicating with said user.

4. The method of claim 1 wherein said user data further includes length of time measurements of said communications between said user and said people.

5. The method of claim 1 wherein said user data further includes social bookmarks or tags of communication and social media by said user and said people.

6. The method of claim 1 where in said user data further includes names, length of time measurements, social bookmarks or tags of communication and social media of said people communicating with other users.

7. The method of claim 1 wherein said filtered user data is mapped against a users contact directory.

8. The method of claim 1 wherein said mapping comprises utilizing a Communications Ranking technique to determine at least one of social rank, relevance and attention for a users social network.

9. A non-transitory computer readable storage medium having computer readable code thereon for mapping user conversations, the medium comprising:
   instructions for aggregating communications and conversations between a user and people across multiple modes of communication to provide an aggregated set of user data;
   instructions for filtering said aggregated set of user data to provide filtered user data; and
   instructions for mapping said filtered user data to determine at least one of social rank, relevance and attention for a users social network; and
   instructions for generating a map to display said at least one of social rank, relevance and attention for a users social network, wherein said map includes at least one of the group consisting of a map wherein:
   ii) a user is a central node and wherein a circle of people said user communicates with are shown as nodes with links to said user and wherein each link has a corresponding weight, used to indicate an amount of time and an associated prestige for that link to said user; and
   iii) a user is a central node and social media tags with others showing conversations between said user and others and conversations between different parties are shown.

10. The computer readable medium of claim 9 wherein said communications includes at least one of phone calls, voice mail, instant messages, web access, email, tagging of communications and social media, and collaboration sessions.

11. The computer readable medium of claim 9 wherein said user data includes names of said people communicating with said user.

12. The computer readable medium of claim 9 wherein said user data further includes length of time measurements of said communications between said user and said people.

13. The computer readable medium of claim 9 wherein said user data further includes social bookmarks or tags of communication and social media by said user and said people.

14. The computer readable medium of claim 9 wherein said user data further includes names, length of time measurements, social bookmarks or tags of communication and social media of said people communicating with other users.

15. The computer readable medium of claim 9 wherein said filtered user data is mapped against a users contact directory.

16. The computer readable medium of claim 9 wherein said instructions for mapping comprises instructions for utilizing a Communications Ranking technique to determine at least one of social rank, relevance and attention for a users social network.

17. A computer system comprising:
a memory;
a processor;
a communications interface;
an interconnection mechanism coupling the memory, the processor and the communications interface; and
wherein the memory is encoded with an application providing mapping user conversations, that when performed on the processor, provides a process for processing information, the process causing the computer system to perform the operations of:
aggregating communications and conversations between a user and people across multiple modes of communication to provide an aggregated set of user data;
filtering said aggregated set of user data to provide filtered user data;
mapping said filtered user data to determine at least one of social rank, relevance and attention for a users social network; and
generating a map to display said at least one of social rank, relevance and attention for a users social network, wherein said map includes at least one of the group consisting of a map wherein:

iv) a user is a central node and wherein a circle of people said user communicates with are shown as nodes with links to said user and wherein each link has a corresponding weight, used to indicate an amount of time and an associated prestige for that link to said user; and a user is a central node and social media tags with others showing conversations between said user and others and conversations between different parties are shown.

18. The computer system of claim 17 wherein said communications includes at least one of phone calls, voice mail, instant messages, web access, email and collaboration sessions.

19. The computer system of claim 17 wherein said user data includes names of said people communicating with said user.

20. The computer system of claim 17 wherein said user data further includes length of time measurements of said communications between said user and said people.

21. The computer system of claim 17 wherein said user data further includes social bookmarks or tags of communication and social media by said user and said people.

22. The computer system of claim 17 wherein said user data further includes names, length of time measurements, social bookmarks or tags of communication and social media of said people communicating with other users.

23. The computer system of claim 17 wherein said filtered user data is mapped against a users contact directory.

24. The computer system of claim 17 wherein said mapping comprises utilizing a Communications Ranking technique to determine at least one of social rank, relevance and attention for a users social network.

* * * * *